US011292536B2

(12) United States Patent
Bradley et al.

(10) Patent No.: US 11,292,536 B2
(45) Date of Patent: Apr. 5, 2022

(54) TRAILER FAIRING AND SYSTEM FOR IMPROVED AERODYNAMIC PERFORMANCE

(71) Applicant: Compagnie Generale des Etablissements Michelin, Clermont-Ferrand (FR)

(72) Inventors: Calvin Rhett Bradley, Greenville, SC (US); Justin Kane Morgan, Anderson, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 36 days.

(21) Appl. No.: 16/970,401

(22) PCT Filed: Mar. 1, 2019

(86) PCT No.: PCT/US2019/020352
§ 371 (c)(1),
(2) Date: Aug. 17, 2020

(87) PCT Pub. No.: WO2019/169300
PCT Pub. Date: Sep. 6, 2019

(65) Prior Publication Data
US 2021/0380176 A1    Dec. 9, 2021

Related U.S. Application Data

(63) Continuation of application No. PCT/US2018/020698, filed on Mar. 2, 2018.

(51) Int. Cl.
*B62D 35/00* (2006.01)

(52) U.S. Cl.
CPC ............................ *B62D 35/001* (2013.01)

(58) Field of Classification Search
CPC ........................... B62D 35/00; B62D 35/001
See application file for complete search history.

(56) References Cited

U.S. PATENT DOCUMENTS 3,960,402 A    6/1976 Keck
3,999,797 A    12/1976 Kirsch
(Continued)

FOREIGN PATENT DOCUMENTS

CA    2715137 A1 *    3/2011    ........... B62D 35/001
CN    105829134 A    8/2016
(Continued)

OTHER PUBLICATIONS

European Patent Office; International Search Report and Written Opinion for patent application PCT/US2019/020352, filed Mar. 1, 2019; Publisher: European Patent Office, Rijswijk, Netherlands; dated May 28, 2019; pp. 1-20, enclosed.
(Continued)

*Primary Examiner* — Lori L Lyjak
(74) *Attorney, Agent, or Firm* — Neal P. Pierotti

(57) ABSTRACT

An apparatus for a trailer is provided that has a top fairing configured for being mounted to a top surface of the trailer at a location closer to the back of the trailer than the front of the trailer. The trailer has a longitudinal direction, a lateral direction, and a vertical direction. A side fairing is also present and is configured for being mounted to a side surface of the trailer. The top fairing engages the side fairing.

14 Claims, 7 Drawing Sheets

(56) References Cited

U.S. PATENT DOCUMENTS

| | | |
|---|---|---|
| 4,022,508 A | 5/1977 | Saczawa, Jr. |
| 4,057,280 A * | 11/1977 | MacCready, Jr. .... B62D 35/001 296/180.4 |
| 5,240,306 A | 8/1993 | Flemming |
| 5,280,990 A | 1/1994 | Rinard |
| 5,564,750 A | 10/1996 | Bajorek |
| 6,959,958 B2 | 11/2005 | Basford |
| 7,497,502 B2 | 3/2009 | Wood |
| 7,578,541 B2 | 8/2009 | Layfield |
| 8,251,436 B2 | 8/2012 | Henderson |
| 8,684,447 B2 | 4/2014 | Henderson |
| 8,783,757 B2 | 7/2014 | Henderson |
| 8,899,660 B1 | 12/2014 | Praskovskaya |
| 9,457,847 B2 | 10/2016 | Smith |
| 9,637,184 B1 | 5/2017 | Bennett |
| 2008/0061598 A1 | 3/2008 | Reiman et al. |
| 2009/0189414 A1 | 7/2009 | Boivin |
| 2009/0236872 A1 | 9/2009 | Wood |
| 2010/0164249 A1 | 7/2010 | Nusbaum |
| 2010/0264690 A1 | 10/2010 | Brown |
| 2011/0062749 A1 | 3/2011 | Graham |
| 2015/0197291 A1 | 7/2015 | Roush |
| 2015/0259014 A1 | 9/2015 | Baker |
| 2017/0029044 A1 | 2/2017 | Senatro |

FOREIGN PATENT DOCUMENTS

| | | |
|---|---|---|
| EP | 3284662 A1 | 2/2018 |
| GB | 2074107 B | 10/1981 |
| GB | 2511871 A | 9/2014 |
| JP | H0350593 B2 | 8/1991 |
| JP | 2013052762 A | 3/2013 |
| KR | 20110036969 A | 4/2011 |
| WO | 2004062953 A2 | 7/2004 |
| WO | 2011034535 A1 | 3/2011 |
| WO | 2012099569 A1 | 7/2012 |
| WO | 2014074536 A1 | 5/2014 |
| WO | 2014162158 A2 | 10/2014 |
| WO | 2016083997 A1 | 6/2016 |

OTHER PUBLICATIONS

European Patent Office; International Search Report and Written Opinion for patent application PCT/US2018/020698, filed Mar. 2, 2018; Publisher: European Patent Office, Rijswijk, Netherlands; dated Oct. 31, 2018, pp. 1-16, enclosed.

* cited by examiner

TRAILER FAIRING AND SYSTEM FOR IMPROVED AERODYNAMIC PERFORMANCE

CROSS-REFERENCE TO RELATED APPLICATIONS

The present application is a 35 U.S.C. § 371 application of PCT/US19/20352 filed on Mar. 1, 2019 and entitled "Trailer Fairing and System for Improved Aerodynamic Performance." PCT/US19/20352 claims the benefit of PCT/US18/20698 filed on Mar. 2, 2018 and entitled "Trailer Fairing and System for Improved Aerodynamic Performance." PCT/US19/20352 and PCT/US18/20698 are both incorporated by reference herein in their entireties for all purposes.

FIELD OF THE INVENTION

The subject matter of the present invention relates to an end of trailer fairing and system that improves aerodynamic performance of the trailer. More particularly, the present application involves an end of trailer fairing that features a top fairing in contact with a side fairing at the end of the trailer that enhances aerodynamic performance. Additional components of the system include angled trailer skirts, rear skirts, and rounded corners between the top and side fairings.

BACKGROUND OF THE INVENTION

Trailers towed by trucks and similar apparatuses for transporting cargo can be large, unwieldy, and include geometries which invite inefficiencies during travel. One aspect of these inefficiencies concerns the aerodynamics of the trailer. For maximum capacity, the trailer is box shaped which is not the most aerodynamically available option. Further, the rear door of the trailer is made in a particular manner to facilitate loading and unloading, such as utilizing a large opening, and the rear door may not have optimal aerodynamic properties. In an effort to improve trailer aerodynamics, trailers have been built, supplemented, or retro-fitted with trailer skirts (or side skirts), devices affixed to the underside which limit air circulating in the empty space between the trailer's axles. By reducing the amount of airflow in this space, drag caused by turbulence is reduced and permits the trailer to be towed more efficiently, increasing the gas mileage and performance of the vehicle and its cargo. Other ways of improving aerodynamic performance of the trailer involves the provision of fairings to the end of the trailer. The fairings modify the airflow around or off of the end of the trailer to reduce drag. It is known to produce fairings that have a curved outer surface that extend from the leading edge of the fairing to the tailing edge of the fairing. These curved fairings change the airflow about the end of the trailer to reduce dragging force. Although capable of reducing some dragging force at the end of the trailer, additional fairing designs that can stabilize the airflow wake structure behind the trailer are desirable. Still further, it would be desirable to have an aerodynamic system that incorporates a trailer end fairing for purposes of increasing the aerodynamic performance of the trailer. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
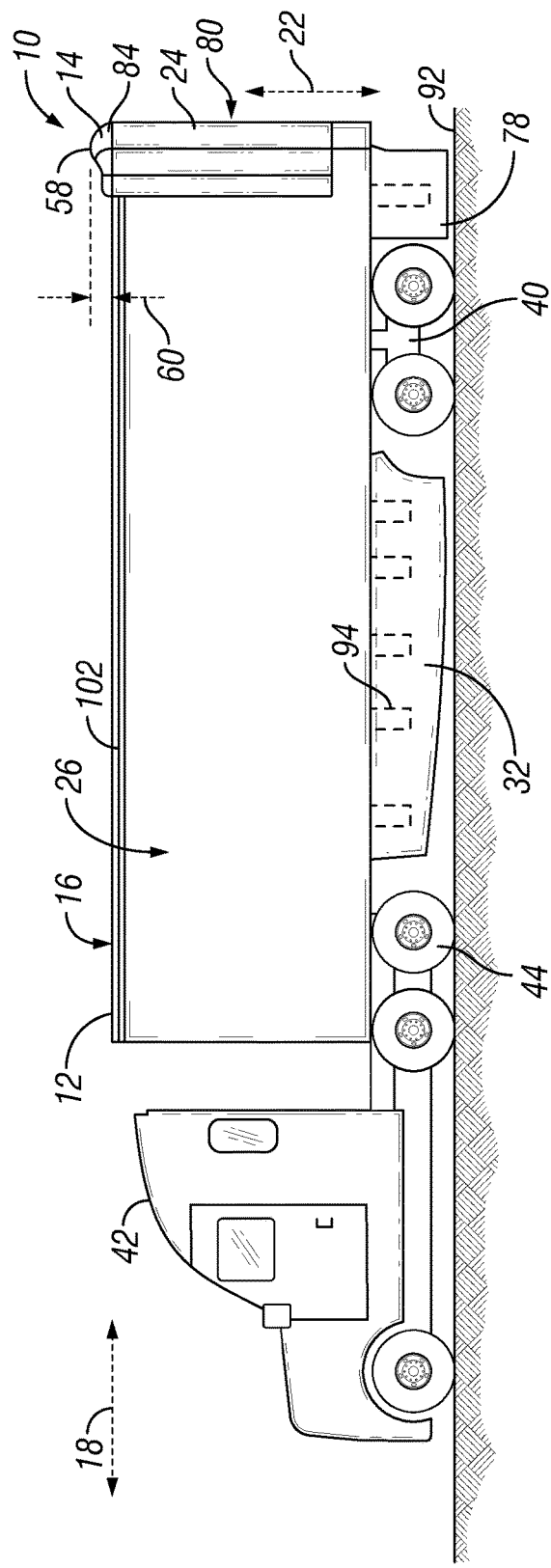
FIG. 1 is a side view of a tractor hauling a trailer that includes an apparatus with skirts parallel to sides of the trailer in accordance with one exemplary embodiment.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for an apparatus 10 that achieves aerodynamic performance of a trailer 12 when driven by a tractor 42. The apparatus includes a top fairing 14, a first side fairing 24, and an optional second side fairing 28 located at the back of the trailer 12. The side fairings 24, 28 engage the top fairing 14 such that a gap is not present between them and a continuous surface extends from the side fairings 24, 28 onto the top fairing 14. In other words, the top fairing 14 connects to both of the side fairings 24, 28 to form a continuous surface at the back section of the trailer 12. The apparatus 10 may optionally include first and second trailer skirts 32, 36 in addition to the top fairing 14 and side fairings 24, 28 to further enhance aerodynamic performance. Yet further, the apparatus 10 can be equipped with one or more trailer rear skirts 78, 82 to achieve airflow properties upon normal use of the tractor 42 trailer 12. Additional features can be incorporated into the system the apparatus 10 comprises as will be discussed in order to achieve different aerodynamic properties of the trailer 12.

Figure 2:
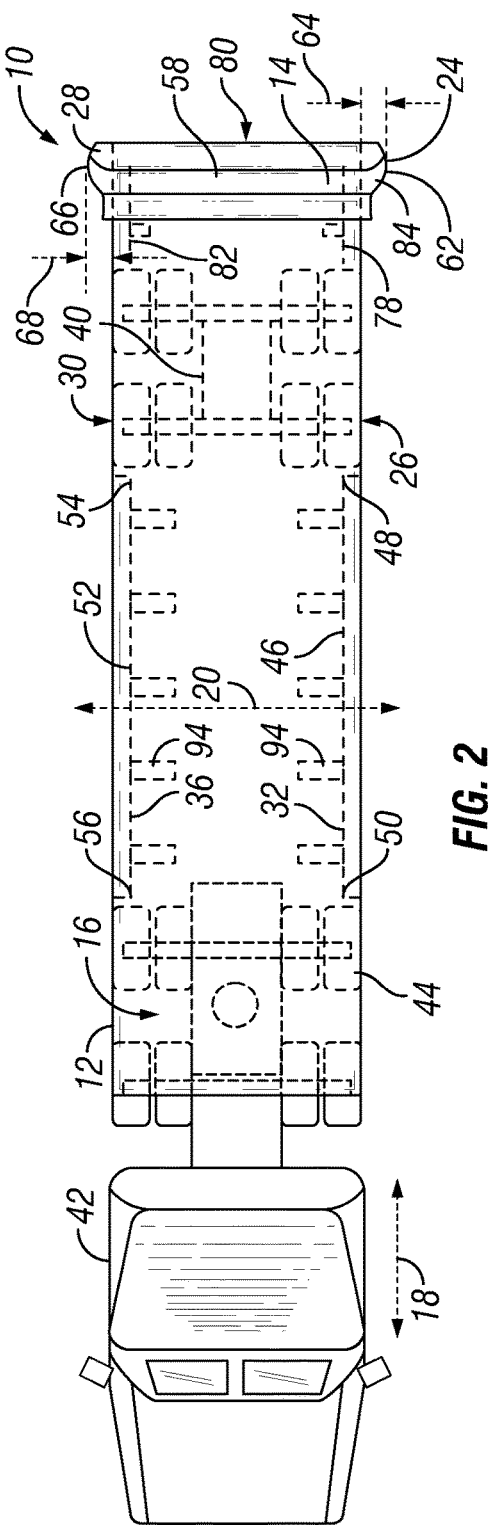
FIG. 2 is a top view of FIG. 1.

FIGS. 1 and 2 show a tractor 42 with attached trailer 12 on the ground 92. In normal use, the tractor 42 is driven forward in the longitudinal direction 18 and aerodynamic features of the system are designed to handle this forward motion. Cross flow of air will be imparted onto the trailer 12 in the lateral direction 20 and the apparatus 10 may include features addressed to this cross-flow. The first side fairing 24 is located at the back of the trailer 12 in the longitudinal direction 18 and is mounted onto or over the first side surface 26 of the trailer 12. In a similar manner, the second side fairing 28 is mounted on or over the second side surface 30 of the trailer 12. The top fairing 14 is mounted on or over a portion of the top surface 16 of the trailer 12. The fairings 14, 24, 28 are located closer to the back end 80 of the trailer 12 in the longitudinal direction 18 than to the front of the trailer 12. In some instances, the fairings 14, 24, 28 could extend to the back end 80 of the trailer 12, and in yet other embodiments one or more of the fairings 14, 24, 28 could extend rearward of the back end 80 of the trailer 12 up to 2 inches in the longitudinal direction 18. The upper surfaces of the fairings 14, 24, 28 may have flat, angled, or curved sections so that airflow over them will achieve certain aerodynamic performance when the trailer 12 is driven. The top fairing 14 extends across the entire width of the top surface 16 in the lateral direction 20, but the side fairings 24, 28 extend along a majority of the height of the side surfaces 26, 30 in the vertical direction 22 but not along the entire height of the side surfaces 26, 30 in the vertical direction 22. The fairings 14, 24, 28 are structures that can be curved panels that attach at a leading edge to the top surface 16 and side surfaces 26, 30 in such a way that the fairings 14, 24, 28 curve or otherwise extend away from the surface 16, 26, 30 in question and then curve or otherwise extend back to the surface 16, 26, 30 in question. This extension away from and then back to can be viewed in the forward to rearward direction in the longitudinal direction 18.

The side fairings 24, 28 engage the top fairing 14. This engagement may be along the entire lengths of the side fairings 24, 28 in the longitudinal direction 18 or may be less than along their entire lengths. There could be gaps in the engagement of the side fairings 24, 28 to the top fairing 14 along a portion of their lengths in some instances. Further, there could be cases where one or two of the fairings 14, 24, 28 are longer than the other one or two and in these instances there would be longitudinal sections that are not in engagement. Further, additional designs exist in which one of the two side fairings 24, 28 does not engage the top fairing 14 at all, but the other one of the two side fairings 24, 28 does in fact engage the top fairing 14. The engagement between the side fairings 24, 28 and the top fairing 14 may be form a 90 degree bend, or there could be convex surfaces between these components 14, 24, 28 that achieve a smoother transition at their engagement locations, or a combination of various geometric designs can be present at the points of engagement. Engagement of the top fairing 14 with at least one of the side fairings 24, 28 achieves a desired aerodynamic performance of the trailer 12 during normal use. The fairings 14, 24, 28 can be mounted onto the surfaces 16, 26, 30 through the use of screws, bolts, adhesives, mechanical fasteners or even through integral formation in some instances and may or may not engage the surfaces 16, 26, 30.

Trailer skirts 32, 36 can be added to the apparatus 10 to work with the fairings 14, 24, 28 in achieving aerodynamic performance of the trailer 12. It has been discovered that the apparatus 10 having the fairings 14, 24, 28 work particularly well with the addition of the trailer skirts 32, 36 to the apparatus 10. The trailer skirts 32, 36 are located rearward of drive tires 44 of the tractor 42 in the longitudinal direction 18 and are located at the bottom of the trailer 12 and function to direct airflow at least partially from the bogie assembly 40 of the trailer 12. The trailer skirts 32, 36 are panels that have surfaces that can be variously shaped that direct airflow accordingly. The panels of the trailer skirts 32, 36 in FIGS. 1 and 2 are parallel to the side surfaces 26, 30 of the trailer 12. In this regard, the trailer skirt 32 is closer to side surface 26 than to side surface 30 and is parallel to side surface 26. In a similar vein, trailer skirt 36 is closer to side surface 30 than to side surface 26 and is parallel thereto. The trailer skirts 32, 36 are located completely rearward of the drive tires 44 and completely forward of the bogie assembly 40 in the longitudinal direction 18. However, in other embodiments, a portion of the trailer skirts 32, 36 could extend to the bogie assembly 40 so that they are not completely forward of the bogie assembly 40. The trailer skirts 32, 36 can be connected or held onto the trailer 12 by any mechanism. For example, brackets 94 are present to bolt the trailer skirts 32, 36 onto the underside of the trailer 12.

The first trailer skirt 32 has a rearward most point 48 in the longitudinal direction 18 for redirecting airflow. Further, the first trailer skirt 32 has a forward most point 50 for redirecting airflow in the longitudinal direction 18. In evaluating the parallel nature of the first trailer skirt 32 to the first side surface 26, a first line 46 is drawn from the rearward most point 48 to the forward most point 50. The first side surface 26 is parallel to the longitudinal direction 18 in that the trailer 12 is box shaped and extends effectively in the longitudinal direction 18 regardless of whether the side surfaces 26, 30 are completely flat or have grooves or other features thereon. One can compare the angle the first line 46 makes to the line the first side surface 26 forms when viewed in the top view of FIG. 2 and ascertain that these two lines 46, 26 are parallel.

The second trailer skirt 36 has a rearward most point 54 that is the part of this component located most rearward in the longitudinal direction 18 that functions to redirect air. Likewise, the second trailer skirt 36 has a forward most point 56 for directing airflow in the longitudinal direction 18. A second line 52 can be drawn from the rearward most point 54 to the forward most point 56. The line that the second side surface 30 makes when viewed from the top in FIG. 2 is observed to be parallel to the second line 52. In this manner, the first and second trailer skirts 32, 36 can be said to be arranged in a parallel manner to the first and second side surfaces 26 and 30 and the panels that direct airflow are flat with no change in angular orientation. Although the two trailer skirts 32, 36 are arranged in a similar manner to one another, it is to be understood that in other versions of the apparatus 10 that one of the trailer skirts 32 could for instance be parallel to its side surface 26 while the other trailer skirt 36 is not parallel to its side surface 30.

Figure 3:
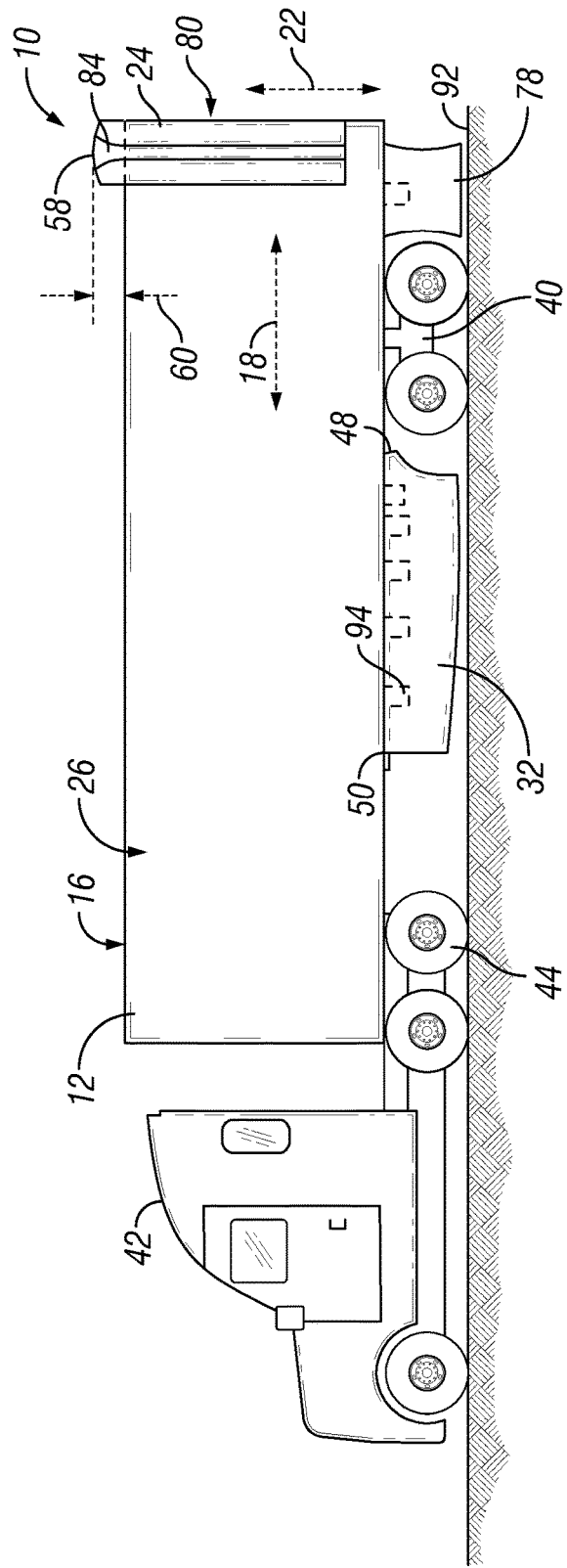
FIG. 3 is a side view of a tractor hauling a trailer that has an apparatus in accordance with another embodiment that features angled skirts.
Figure 4:
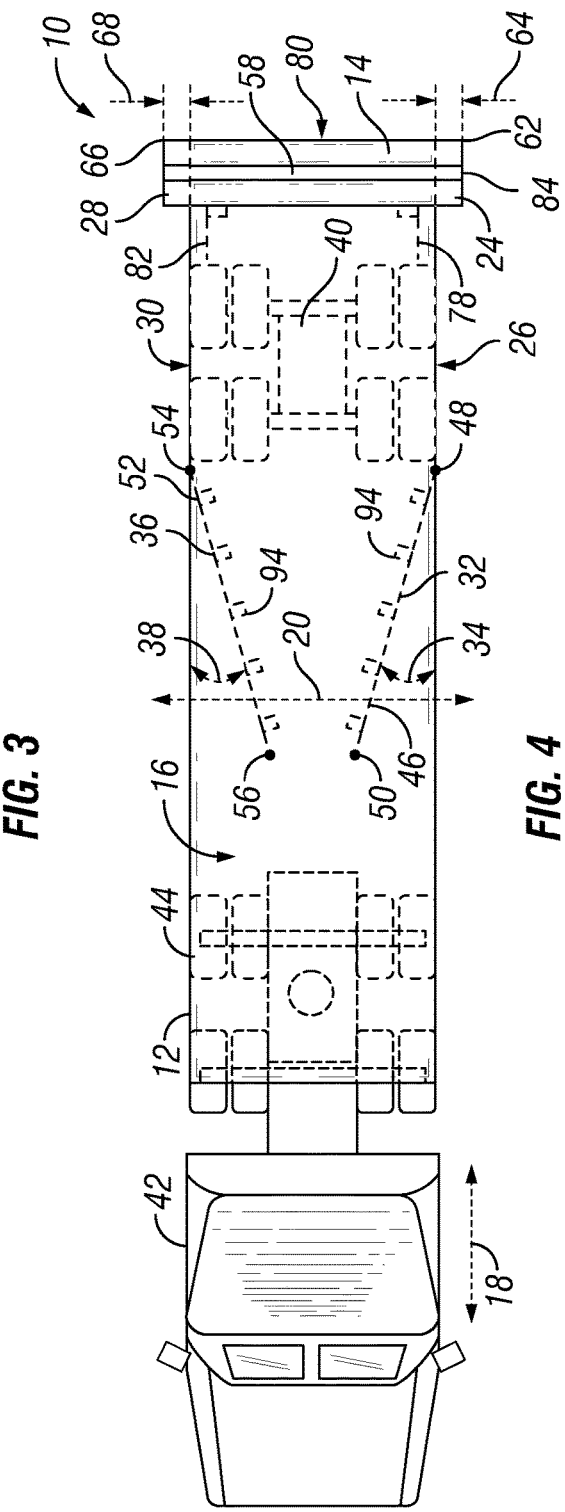
FIG. 4 is a top view of FIG. 3.

Another configuration of the trailer skirts 32, 36 are illustrated in FIGS. 3 and 4 in which a pair of skirts 32, 36 are again present and are located completely between the drive tires 44 and the bogie assembly 40 in the longitudinal direction 18. The panels making up the skirts 32, 36 are again flat along their entire lengths. The first trailer skirt 32 has a rearward most point 48 and a forward most point 50 with the first line 46 drawn between and connecting these points 48, 50 that matches the panel that directs airflow of the first trailer skirt 32. However, the first line 46 is not parallel to the line of the first side surface 26 as seen in the top view of FIG. 4. Instead, the first line 46 is oriented at an angle 34 to the first side surface 26. The angle 34 is 20 degrees. In other embodiments, the angle 34 may be from 0 degrees (parallel) up to and including 20 degrees. In other embodiments, the angle 34 is greater than 0 degrees up to and including 20 degrees. The angle 34 is measured in the direction of extension of the trailer skirt 32 forward in the longitudinal direction 18. The angle 34 is the angle of the panel of the first trailer skirt 32 that directs air to the first side surface 26 because this panel is the same as and overlaps the first line 46. As such, the first line 46 is measured in relation to the line created by the top view of the first side surface 26 and the angle 34 between these two lines is measured. Placement of the angle 34 in the 0-20 degree range allows for complimentary aerodynamic performance of the skirt 32 used in combinations with the fairings 10, 24, 28.

The second trailer skirt 36 has a second line 52 that is oriented at an angle 38 to the line of the second side surface 30 when viewed from the top in FIG. 4. This angle 38 is 20 degrees. In other embodiments, the angle 38 may be from 0 (parallel) to 20 degrees. The angle 38 can be the same as angle 34, or these angles 38, 34 can be different from one another in relation to the trailer 12 so that the skirts 32, 36 are not oriented at the same magnitude of angularity to their respective side surfaces 26, 30. The angle 38 is again measured by looking at the direction of extension of the second trailer skirt 36 forward in the longitudinal direction 18. The direction of extension of the second line 52 is noted upon moving forward in the longitudinal direction 18 from the rearward most point 54 to the forward most point 56. This second line 52 is compared to the line created by the second side surface 30 upon viewing it from above in FIG. 4 and the angle 38 is measured as the orientation between these two lines. The skirts 32, 36 are arranged so that they extend constantly inboard in the lateral direction 20 upon extension forward in the longitudinal direction 18. In this regard, at no point do the skirts 32, 36 extend outboard in the lateral direction 20, but instead only in the inboard direction as observed in the forward longitudinal direction 18.

Figure 5:
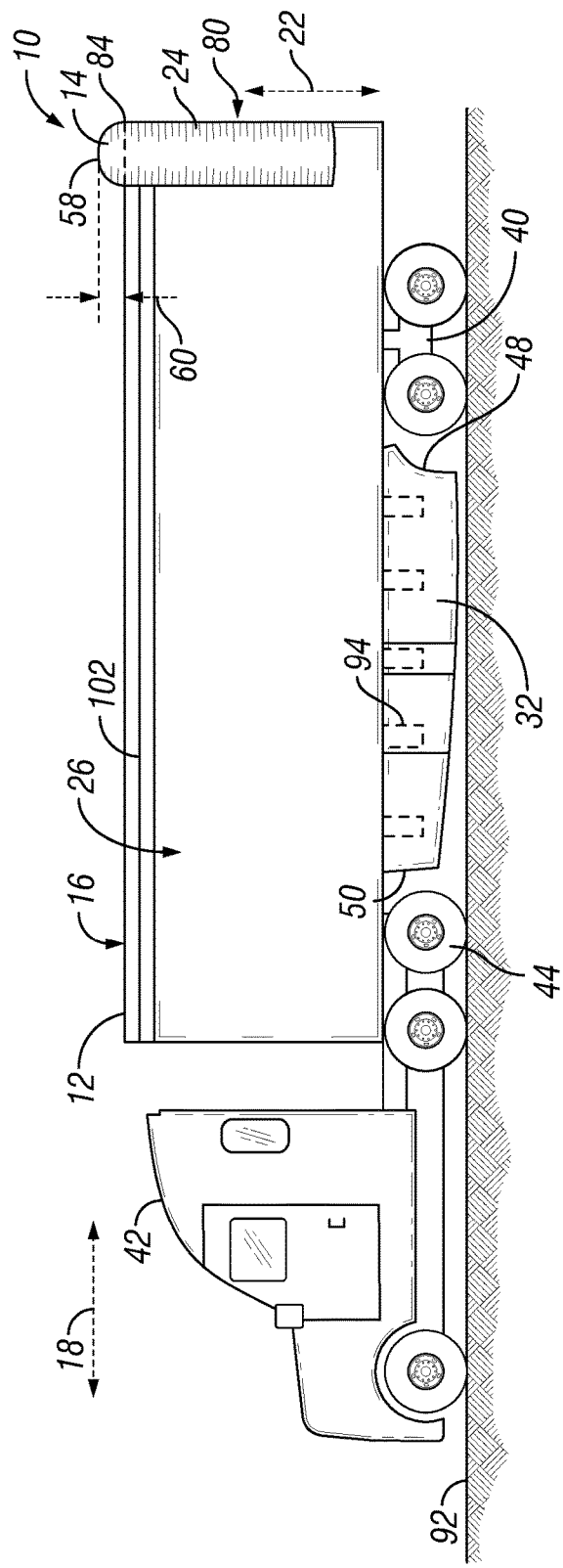
FIG. 5 is a side view of a tractor hauling a trailer that has an apparatus in accordance with another embodiment that features skirts with multiple angled sections.
Figure 6:
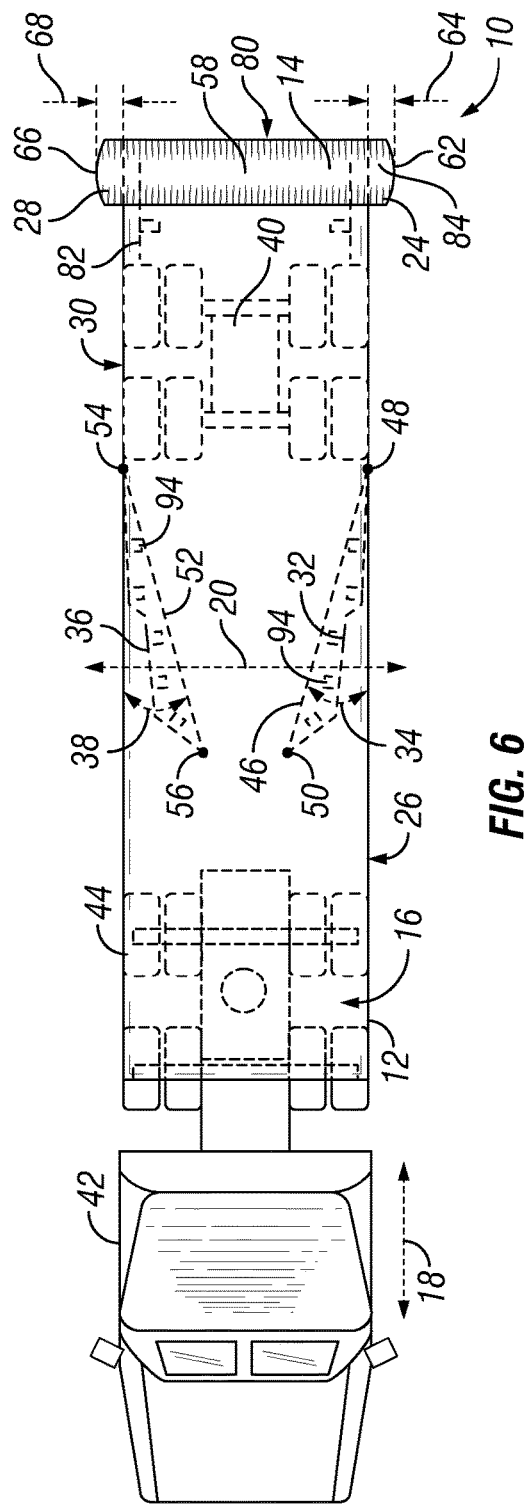
FIG. 6 is a top view of FIG. 5.

Another version of the first and second trailer skirts 32, 36 is shown in FIGS. 5 and 6. Unlike previous versions, the panels that make up the trailer skirts 32, 36 do not have flat surfaces across their entire lengths that direct the airflow. Instead, the skirts 32, 36 have sections that are oriented at different angles to one another and at different angles to the trailer 12. Although four such sections that change the angular orientation of the skirts 32, 36 are shown, fewer or more may be present. However, the panels that direct airflow still have a rearward most point 48, 54 and a forward most point 50, 56. The first and second lines 46, 52 are drawn through these points 48, 54, 50, 56 as previously discussed and the angles 34, 38 are calculated also as previously discussed. The panels making up the airflow surfaces of the skirts 32, 36 do not lie completely on these lines 46, 52 as in other embodiments but are for the most part out of sync with the lines 46, 52. A majority may be inboard of the lines 46, 52 in the lateral direction 20 in some embodiments, and in other embodiments a majority may be outboard of the lines 46, 52. As with other embodiments, the surfaces that direct airflow need not be flat, but could be curved and could have grooves or other features. The skirts 32, 36 could change their direction of orientation so that they are moving either inboard or outboard in the lateral direction 20 at different points. However, the lines 46, 52 still have a single angle 34, 38 for measurement even if localized portions of the skirts 32, 36 are oriented at different angles from one another and from that of the lines 46, 52.

Figure 8:
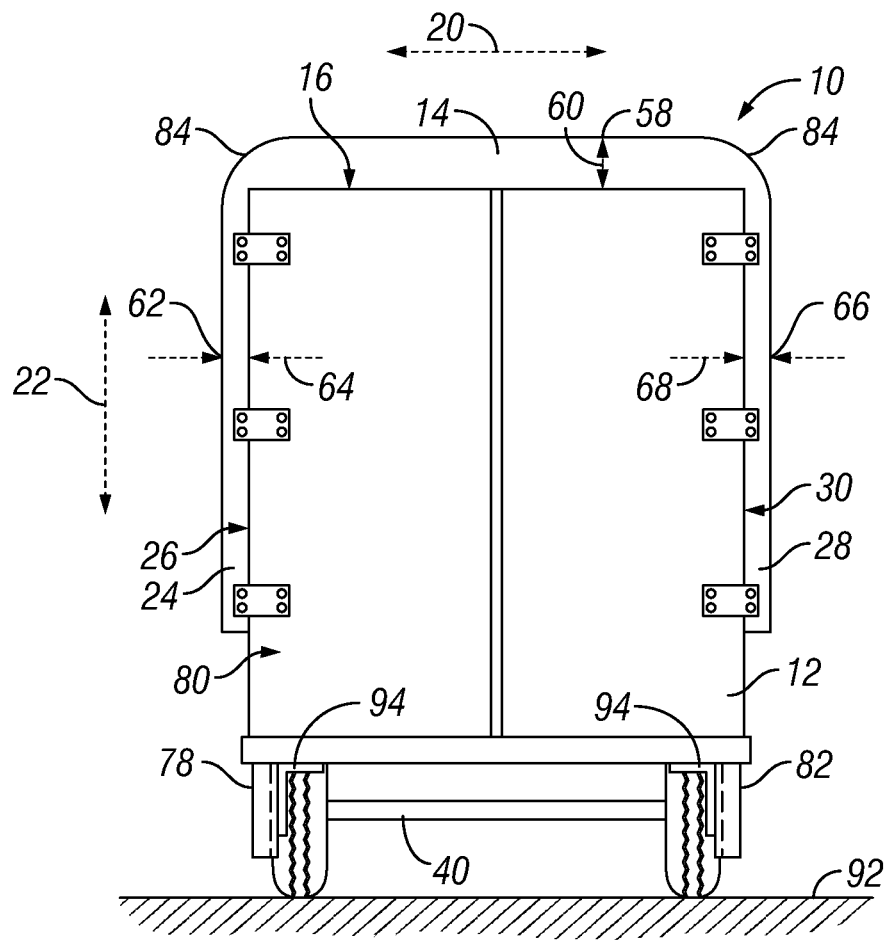
FIG. 8 is a back view of the apparatus mounted onto a trailer.

FIG. 8 shows a back view of the trailer 12 with attached apparatus 10. The top fairing 14 has an upper terminal point 58 that is the highest point of the top fairing 14 in the vertical direction 22. There may be a single upper terminal point 58 on the top fairing 14, or there may be multiple locations where the upper terminal point 58 is located. The height 60 of the top fairing 14 is measured from the top surface 16 of the trailer 12, at the same location at the upper terminal point 58 in the lateral direction 20, to the upper terminal point 58 in the vertical direction 22. The top surface 16 is a panel that covers the cargo area of the trailer. The top surface 16 near the back end 80 may have a a rain gutter located thereon which would be an indentation on the top surface 16 that extends downward in the vertical direction 22. Other structural elements could be present at or on the top surface 16 near the back end. When describing the heights of the top fairings 14 and discussion of the associated top surfaces 16, it is to be understood that the heights are measured from the panel section of the top surface 16 and not from the rain gutters or other structural elements at or on the top surface 16. The side fairing 24 has an outer terminal point 62 located on its outer surface which is the portion of the side faring 24 farthest from the center of the trailer 12 in the lateral direction 20. There may be a single point on the outer surface of the side fairing 24 that is farthest and thus a single outer terminal point 62, or there may be multiple locations along the side fairing 24 that are farthest and thus a plurality of outer terminal points 62 are present. The width 64 of the side fairing 24 may be measured from the side surface 26, that is as the same vertical location as the outer terminal point 62 in the vertical direction 22, to the outer terminal point 62 in the lateral direction 20. The magnitude of the height 60 is greater than the magnitude of the width 64 in accordance with some exemplary embodiments. In a similar vein, the second side fairing 28 has a width 68 that is measured from the second side surface 30, that is at the same location in the vertical direction 22, to an outer terminal point 66 in the lateral direction 20. The outer terminal point 66 is the point of the outer surface of the second side fairing 28 that is farthest from the center of the trailer 12 in the lateral direction 20. The magnitude of the width 66 is less than the magnitude of the height 60 in accordance with some exemplary embodiments. In some instances, the magnitudes of the widths 64 and 68 are the same.

Figure 9:
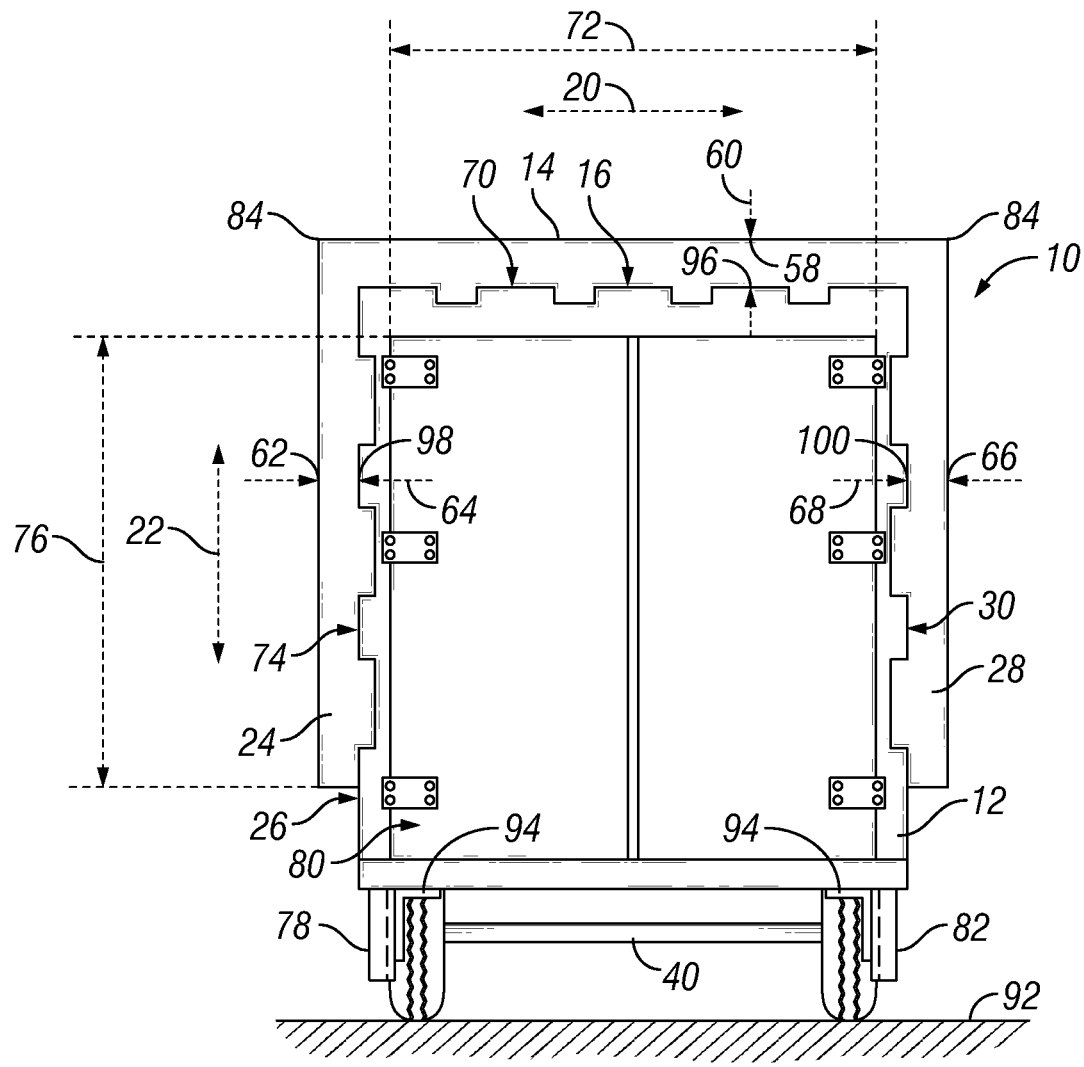
FIG. 9 is a back view of the apparatus mounted onto a trailer that has top and side surfaces that are not even in height or width.

FIG. 9 shows an alternate embodiment in which the trailer 12 does not have flat side surfaces 26, 30 or a flat top surface 16 at least at locations onto which the apparatus 10 is mounted. The surfaces 26, 30, 16 could be grooved or have different areas of height/width. The area 70 of the top surface 16 engaged or covered by the top fairing 14 has a width 72 that extends in the lateral direction 20. The top fairing 14 extends into the grooves present on the top surface 16 so as to fill them in, but in other arrangements the grooves could be completely or partially empty. A highest location 96 of the top surface 16 is the location of the top surface 16 that is highest in the vertical direction 22. There may be a single highest location 96, or there may be multiple highest locations 96 along the width 72 of the area 70. The height 60 is measured from the highest location 96 to the upper terminal point 58 of the outer surface of the fairing 14 in the vertical direction 22. The side fairing 24 can be arranged in a similar manner in which an area 74 of the first side surface 26 has different inboard and outboard locations in the lateral direction 20 along an entire height 76 of the area 74. The entire height 76 is the height in the vertical direction 22 that the side fairing 24 engages or covers when the apparatus 10 is attached. One or more locations of the side surface 26 can have a maximum outboard location 98 in the lateral direction 20, and a most outboard location 98 is located on these one or more points of the side surface 26. In FIG. 9, the most outboard location 98 also has the same positioning in the vertical direction 22. The width 64 is measured from the most outboard location 98 to the outer terminal point 62 in the lateral direction 20. The magnitude of the height 60 may be greater than the magnitude of the width 64.

Also, the second side faring 28 can have a second side surface 30 that is not flat but instead features grooves or other depressions cut therein. The second side fairing 28 may cover or be inserted into some or all of the grooves on the second side surface 30 and includes an outer terminal point 66 which is the point of the second side faring 28 that is farthest from the center of the trailer 12 in the lateral direction 20. There may be a single outer terminal point 66, or multiple locations of the second side fairing 28 may include an outer terminal point 66. In a similar manner, the second side surface 30 may have a single or a plurality of maximum outboard locations 100 which are the portions of the second side surface 30 farthest from the center of the trailer 12 in the lateral direction 20. The outer terminal point 66 and the maximum outboard location 100 are at the same height in the vertical direction 22. The width 66 is measured from the outer terminal point 66 to the maximum outboard location 100 in the lateral direction. The magnitude of the width 66 is less than the magnitude of the height 60. In some instances, the magnitude of the width 66 is the same as the magnitude of the width 64.

An additional feature of the apparatus 10 may be shown with reference to FIGS. 1 and 2 in which a first trailer rear skirt 78 and a second trailer rear skirt 82 are present on the underside of the trailer 12. The rear skirts 78, 82 have panels that direct airflow to achieve a desired aerodynamic performance of the trailer 12 when driven. The rear skirts 78, 82 can work in combination with the first and second trailer skirts 32, 36 or in some embodiments, the apparatus 10 may only include the fairings 14, 24 and/or 28 and the rear trailer skirts 78, 82 and not the first and second trailer skirts 32, 36. The rear trailer skirts 78, 82 are located rearward of the first and second trailer skirts 32, 36 (if present) in the longitudinal direction 18 and in some instances may be located completely rearward of the bogie assembly 40 in the longitudinal direction 18. In other instances, the rear trailer skirts 78, 82 are not completely behind the bogie assembly 40 but instead at least partially cover the bogie assembly 40 so that at least a portion of the bogie assembly 40 is located at the same position in the longitudinal direction 18 as portions of the first and second rear trailer skirts 32, 36. However, regardless of the positioning of the rear trailer skirts 78, 82 it may be the case that enough space is provided for accessing the bogie assembly 40 to allow for tire and wheel change. The bogie assembly 40 may be capable of sliding forward and rearward in the longitudinal direction 18 so this may effect relative placement between these components 40, 78 and 82 as well. Also, providing enough access to the bogie assembly 40 when rear skirts 78, 82 are present may require one to take into account the positioning of the forward trailer skirts 32, 36 as well.

The rear trailer skirts 78, 82 may not extend to the back end 80 of the trailer 12 in the longitudinal direction 18. Instead, the rear trailer skirts 78, 82 may extend may stop short of the back end 80 at least 0.5 meters from the back end 80 in the longitudinal direction so that a space that is at least 0.5 meters exists from the back end 80 to the rearward longitudinal points of the first and second trailer rear skirts 78, 82 in the longitudinal direction 18. The rear trailer skirts 78, 82 may be attached to the bottom of the trailer 12 via brackets 94 and can extend in the vertical direction 20 towards the ground 92 stopping short to allow sufficient clearance thereto. The embodiments in FIGS. 1-4 all have 2 rear trailer skirts 78, 82 but a single one of the rear trailer skirts 78 or 82 could be present in other embodiments. In still further versions, the first rear trailer skirt 78 is configured differently than the second rear trailer skirt 82. In the FIGS. 5 and 6 embodiment of the apparatus 10, the rear trailer skirts 78, 82 are not present and instead only the fairings 24, 28, 14 and the forward trailer skirts 32, 36 are present in the apparatus 10. The panels that make up the rear trailer skirts 78, 82 could be configured in the same manners as previously discussed with respect to the forward trailer skirts 32, 36 (for example the air directing panels are parallel to the first and second side surfaces 26, 30) and a repeat of this information is not necessary. In some instances, there may be a small angle associated with the rear trailer skirts 32, 36. This small angle may be an inward displacement at the rear ⅓ of the rear trailer skirts 78, 82 in the longitudinal direction 18. The amount of the displacement can be less than 3 inches inboard in the lateral direction 20. With respect to lateral placement of the rear trailer skirts 78, 82, they may be positioned not more than 2 inches inside of their respective side surfaces 26, 30 in the lateral direction 20. In other embodiments, the panels of the rear trailer skirts 78, 82 or portions thereof sit outside of the side surfaces 26, 30 by up to 2 inches. The bracket 94 may be bifurcated to allow such placement. In some embodiments, the rear trailer skirts 78, 82 are parallel allowing for variation in from the side surfaces 26, 30 by 2 inches for the front ⅔ of the skirts 78, 82 in the longitudinal direction 18, and 4 inches from the side surfaces 26, 30 at the back edges of the skirts 78, 82 in the longitudinal direction 18. The lower extent of the trailer 12 can be tapered up to reduce the changes of impact with the ground 92 caused by the departure angle.

With reference back to FIG. 9, the intersection of the top fairing 14 with the side fairings 24, 28 includes two sharp 90 degree corners 84 at their intersection. In some embodiments, the corner 84 can be rounded and configured to adjust aerodynamic performance A rounded corner 84 may achieve desired aerodynamic performance in relation to cross-winds imparted onto the trailer 12 through normal, forward use of the trailer 12 in the longitudinal direction 18. This reduction in drag from cross-winds may increase the fuel efficiency of the tractor 42 trailer 12 vehicle. FIG. 8 shows the corners 84 at the fairing 14, 24, 28 intersections being rounded instead of having a sharp edge. Both corners 84 can be configured to have the same size, shape, and features, or they may be different in different embodiments, especially when the first side fairing 24 is not the same as the second side fairing 28. The corners 84 can be described as being portions of the side fairings 24 and 28, can be portions of the top fairing 14, can be portions of all of the fairings 14, 24, 28, or may be separate components from the fairings 14, 24 and 28. However, the corner 84 should be configured so that at least some portion of the intersection of the top fairing 14 and the side faring 24 (and 28 in some embodiments) is continuous. The entire intersection between the fairings 14, 24, 28 need not be continuous in other versions.

Figure 7:
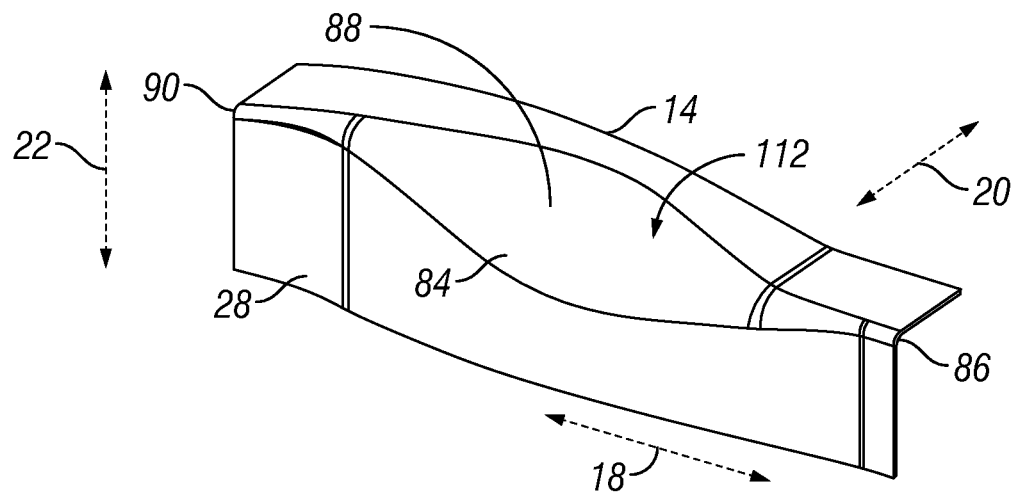
FIG. 7 is a perspective view of a corner of an engaging top and side fairing in accordance with another embodiment.

FIG. 7 is a perspective view of a corner 84 that is present on the right hand side of the trailer 12 and is at the intersection of the second side fairing 28 and the top fairing 14. The corner 84 of FIG. 7 could be the one shown in the FIG. 8 embodiment, or the one shown in other presently disclosed embodiments. The corner 109 at the left hand side of the trailer 12 which is at the intersection of the top fairing 14 and the first side fairing 24 could be made in a similar manner and a repeat of this information is not necessary. In FIG. 7, the leading section 86 of the corner 84 is located at the forward most point of the corner 84 in the longitudinal direction 18. The tailing section 90 of the corner 84 in the longitudinal direction 18 is located at the rearward most position of the corner 84. In between these sections 86, 90 the middle section 88 of the corner 84 is located in the longitudinal direction 18. The corner 84 has a convex outer surface at all points from the leading section 86 to the tailing section 90. However, in other embodiments some portion of the corner 84 need not be convex but could be flat, angled, or concave in shape. The shape of the corner 84 is driven by the size and shape of the meeting fairing 14, 28 surfaces that converge at the corner 84. The radius of curvature of the surface at the leading section 86 may be the same as the radius of curvature of the surface at the tailing section 90, and these two radii of curvature may each be less than the radius of curvature of the surface of the corner 84 at the middle section 88. In some instances, the radius of curvature at the leading section 86 is 0.2 inches, the radius of curvature at the middle section is 5.0 inches, and the radius of curvature at the tailing section 90 is 0.2 inches.

The apparatus 10 may thus include the top fairing 14 and at least one side fairing 24 or 28, and in other embodiments may include the other side fairing 24 or 28, one or both of the forward trailer skirts 32, 36, and/or one or both of the trailer rear skirts 78, 82. The components of the apparatus 10 can be made so that they do not have any moving parts during standard, forward driving use of the trailer 12. The apparatus 10 can be constructed so that it does not interfere with opening of the door at the back end 80. The apparatus 10 may improve fuel savings of the trailer 12 when used. The apparatus 10 can be arranged so that the tires of the bogie assembly 40 are not always covered and are observable due to a break in skirting in the longitudinal direction 18.

Figure 10:
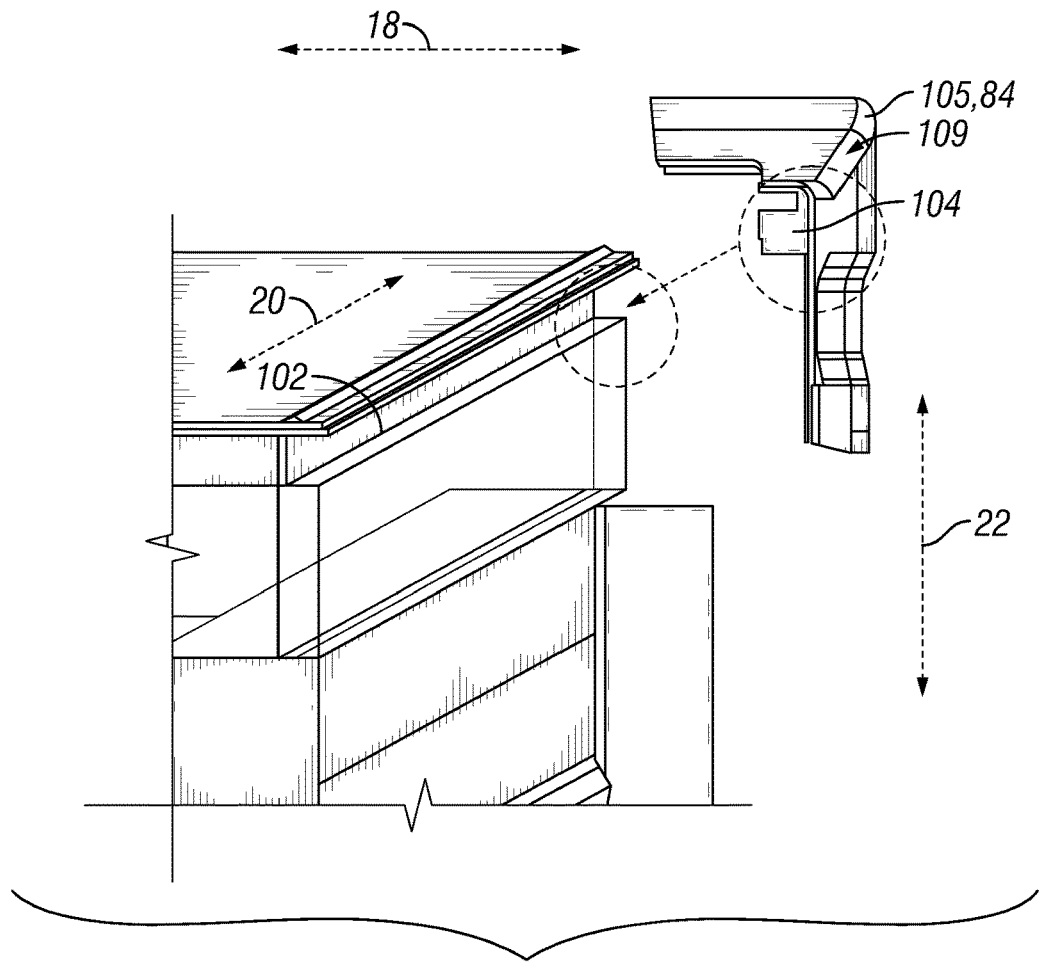
FIG. 10 is a perspective view of a portion of a trailer having a channel with a corner having an air blocking tab disassembled from the trailer.
Figure 11:
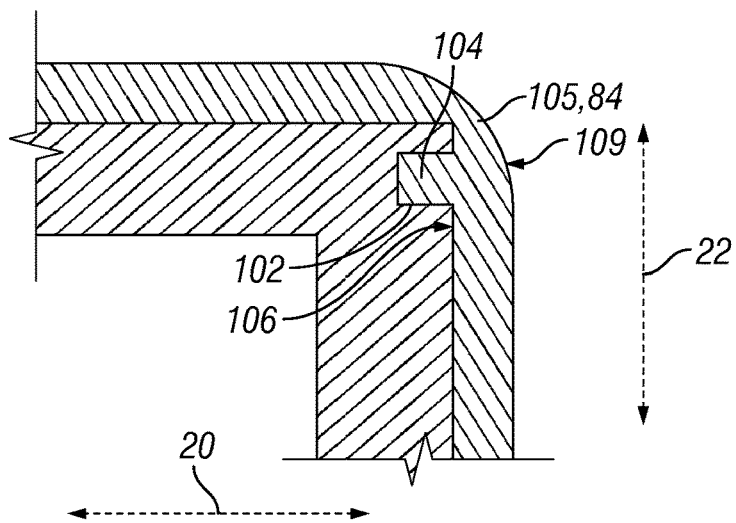
FIG. 11 is a cross-sectional view of a portion of the trailer and the corner assembled with the air blocking tab in the channel.

With reference back to FIG. 1 a channel 102 is located on the side surface 26 and extends in the longitudinal direction 18. There could be several channels on the side surface 26 on other trailers 12, and they may be present for a number of reasons, such as for example increasing the rigidity of the side surface 26. The channel 102 is shown as extending the entire length of the side surface 26 in the longitudinal direction 18, but may extend for only a portion of the longitudinal length in other instances. The channel 102 is located proximate to the top surface 16 and just below it in the vertical direction 22 and extends under the corner 84. Air flow through the channel 102 under the corner 84 will exit behind the corner 84 and fairings 14, 24 and may disrupt the air flow pattern behind the trailer 12. This disruption may not be desirable. FIGS. 10 and 11 demonstrate an alternate embodiment in which the corner 84 is provided with an air blocking tab 104 that is sized and shaped to be inserted into the channel 102. The corner 84 on the first side surface 26 at the top fairing 14 and the first side fairing 24 is identified as corner 105. The air blocking tab 104 extends from an inner surface 106 of the corner 105. The inner surface 106 is the side of the corner 105 opposite from the outer surface 109. The air blocking tab 104 may be square shaped and may be 1.5 inches by 1.5 inches with a relatively thin thickness. The air blocking tab 104 prevents air from flowing through the channel 102 between the trailer 12 and the corner 105 to behind the trailer 12 and disrupting an air flow pattern at that location. The air blocking tab 104 may be provided so that it completely fills in the channel 102 so that all air flow through the channel 102 is blocked at this location.

Figure 12:
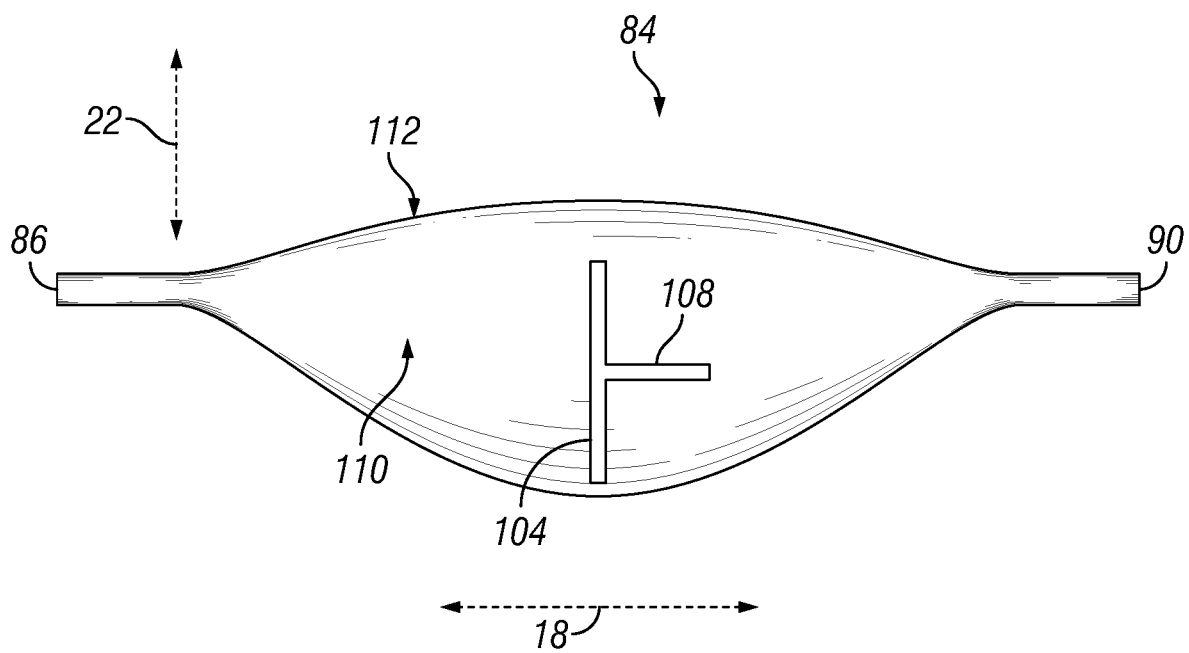
FIG. 12 is an elevation view of the back of a second corner that has an air blocking tab.
Figure 13:
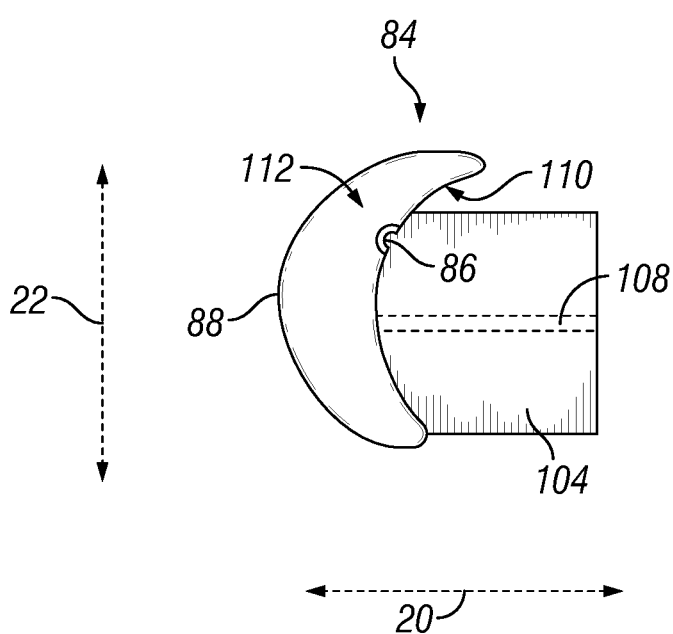
FIG. 13 is a front view of the second corner of FIG. 12.

FIGS. 12 and 13 illustrate an air blocking tab 104 on the second corner 84. The second corner 84 is the corner 84 located on the second side surface 30 that is at the top fairing 14 and the second side fairing 28. The second corner 84 has an outer surface 112 and an oppositely disposed inner surface 110 that is concave in shape. The air blocking tab 104 has a relatively thin thickness when compared to the length of the corner 84 in the longitudinal direction 18. The height of the air blocking tab 104 is less than the height of the corner 84 in the vertical direction 22. The air blocking tab 104 may be positioned so that it is not at the highest or lowest vertical locations of the corner 84 in the vertical direction 22. The air blocking tab 104 is not located at the forward or rearward ends of the corner 84 but is instead located at some point between them in the longitudinal direction 18. The air blocking tab 104 extends inboard in the lateral direction 20 so that it may be located farther inboard in the lateral direction 20 than any other portion of the corner 84.

The air blocking tab 104 could be integrally formed with the corner 84, or may be a separate piece that is attached thereto. A structural support tab 108 is present and engages both the air blocking tab 104 and the inner surface 110 and provides structural support to the air blocking tab 104 to prevent or minimize deflection when air pushes against it during transport of the trailer 12. The structural support tab 108 is located rearward of the air blocking tab 104 in the longitudinal direction 18. When elements 104 and 108 are provided as plates, the structural support tab 108 is oriented at a ninety degree angle to the air blocking tab 104. Although described as only filling a portion of the channel 102, the air blocking tab 104 could in other embodiments fill the entire channel 102. The air blocking tab 104 is contained to the corner 84 and is not part of the side fairing 28 or the top fairing 14. However, in other embodiments, the side fairings 24, 28 and top fairing 14 could in fact have their own air blocking members should there be a channel in the trailer surfaces 16, 26, 30 that would allow air to flow under the fairings 14, 24, 28.

The air blocking tab 104 was described with the first corner 105 in FIGS. 10 and 11, and with the second corner 84 with reference to FIGS. 12 and 13. It is to be understood that any of the description related to the air blocking tab 104 with the first corner 105 could be applied to the air blocking tab 104 of the second corner 84. Likewise, any of the description of the air blocking tab 104 with the second corner 84 could be applied to the air blocking tab 104 of the first corner 105, thus making the description of the air blocking tab 104 and structural support tab 108 interchangeable between the two corners 84, 105. When both corners 84, 105 are present in the apparatus 10, they may both be provided with the air blocking tab 104, or only one of them may have the air blocking tab 104. Further, the configuration of the air blocking tabs 104 need not be identical between the first corner 105 and the second corner 84.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:
1. An apparatus for a trailer, comprising:
a top fairing configured for being mounted to a top surface of the trailer at a location closer to the back of the trailer than to the front of the trailer, wherein the top fairing has a height that extends from the top surface of the trailer to an upper terminal point of the top fairing in the vertical direction, wherein the trailer has a longitudinal direction, a lateral direction, and a vertical direction;

a first side fairing configured for being mounted to a first side surface of the trailer, wherein the top fairing engages the first side fairing, wherein the first side fairing has a width that extends from the first side surface of the trailer to an outer terminal point of the first side fairing in the lateral direction, wherein a magnitude of the height of the top fairing is greater than a magnitude of the width of the first side fairing;

a second side fairing configured for being mounted to a second side surface of the trailer;

a first trailer skirt configured to be carried by the trailer, wherein the first trailer skirt is configured to be oriented such that the first side surface of the trailer extends in the longitudinal direction and the first trailer skirt is oriented at an angle greater than 0 degrees but less than or equal to 20 degrees to the first side surface of the trailer in the direction of extension of the first trailer skirt forward in the longitudinal direction; and a second trailer skirt configured to be carried by the trailer, wherein the second trailer skirt is configured to be oriented such that the second side surface of the trailer extends in the longitudinal direction and the second trailer skirt is oriented at an angle greater than 0 degrees but less than or equal to 20 degrees to the second side surface of the trailer in the direction of extension of the second trailer skirt forward in the longitudinal direction;

wherein a corner with an outer surface is present at the engagement between the top fairing and the first side fairing, wherein the corner is rounded and has a middle section located between a leading section and a tailing section in the longitudinal direction;

wherein the leading section, the middle section, and the tailing section are all rounded and wherein the middle section has a radius of curvature that is larger than a radius of curvature of the leading section, and wherein the middle section has a radius of curvature that is larger than a radius of curvature of the tailing section;

wherein the corner has an inner surface that is located opposite to the outer surface of the corner, wherein the corner has an air blocking tab that extends from the inner surface and is configured for being disposed within a channel of the trailer.

2. The apparatus as set forth in claim 1,
wherein the top fairing engages the second side fairing.

3. The apparatus as set forth in claim 1, wherein the air blocking tab has a length in the longitudinal direction that is less than a length of the corner in the longitudinal direction, wherein the air blocking tab extends farther inboard in the lateral direction than any other portion of the corner, and further comprising a structural support tab that engages the air blocking tab and the inner surface of the corner.

4. The apparatus as set forth in claim 1, wherein the first trailer skirt and the second trailer skirt are configured to be located in the longitudinal direction between a bogie assembly of the trailer and drive tires of a tractor hooked to the trailer.

5. The apparatus as set forth in claim 1, wherein the angle of the first trailer skirt to the first side surface of the trailer is measured by taking a first line from a rearward most point of the first trailer skirt in the longitudinal direction to a forward most point of the first trailer skirt in the longitudinal direction; and
wherein the angle of the second trailer skirt to the second side surface of the trailer is measured by taking a second line from a rearward most point of the second trailer skirt in the longitudinal direction to a forward most point of the second trailer skirt in the longitudinal direction.

6. The apparatus as set forth in claim 1, wherein the first trailer skirt is configured to be oriented relative to the trailer such that the first trailer skirt extends constantly inboard in the lateral direction upon extension from the rearward most point of the first trailer skirt in the longitudinal direction to the forward most point of the first trailer skirt in the longitudinal direction; and
wherein the second trailer skirt is configured to be oriented relative to the trailer such that the second trailer skirt extends constantly inboard in the lateral direction upon extension from the rearward most point of the second trailer skirt in the longitudinal direction to the forward most point of the second trailer skirt in the longitudinal direction.

7. The apparatus as set forth in claim 2,
wherein the second side fairing has a width that extends from the second side surface of the trailer to an outer terminal point of the second side fairing in the lateral direction; and
wherein the magnitude of the height of the top fairing is greater than a magnitude of the width of the second side fairing.

8. The apparatus as set forth in claim 7, wherein the top fairing engages an area of the top surface of the trailer that is not located at the same vertical location across an entire width of the area of the top surface in the lateral direction, wherein the height of the top fairing that extends from the top surface of the trailer to the upper terminal point of the top fairing in the vertical direction is measured from the highest location of the area of the top surface in the vertical direction.

9. The apparatus as set forth in claim 8, wherein the first side fairing engages an area of the first side surface of the trailer that is not located at the same lateral location across an entire height of the area of the first side surface in the vertical direction, wherein the width of the first side fairing that extends from the first side surface of the trailer to the outer terminal point of the first side fairing in the lateral direction is measured from the most outboard location of the area of the first side surface in the lateral direction.

10. The apparatus as set forth in claim 1, further comprising:
a first trailer rear skirt located within 0.5 meters of a back end of the trailer in the longitudinal direction; and
a second trailer rear skirt located within 0.5 meters of the back end of the trailer in the longitudinal direction, wherein the first trailer rear skirt is located closer to the first side surface of the trailer than the second trailer rear skirt.

11. The apparatus as set forth in claim 10, wherein the first trailer rear skirt is parallel to the first side surface, and wherein the second trailer rear skirt is parallel to the second side surface.

12. The apparatus as set forth in claim 1, wherein the top fairing and the side fairing and any other parts of the apparatus if present do not have any moving parts during use.

13. An apparatus for a trailer, comprising:
a top fairing configured for being mounted to a top surface of the trailer at a location closer to the back of the trailer than to the front of the trailer, wherein the top fairing has a height that extends from the top surface of the trailer to an upper terminal point of the top fairing in the vertical direction, wherein the trailer has a longitudinal direction, a lateral direction, and a vertical direction;

a first side fairing configured for being mounted to a first side surface of the trailer, wherein the top fairing engages the first side fairing, wherein the first side fairing has a width that extends from the first side surface of the trailer to an outer terminal point of the first side fairing in the lateral direction, wherein a magnitude of the height of the top fairing is greater than a magnitude of the width of the first side fairing;

a second side fairing configured for being mounted to a second side surface of the trailer;

a first trailer skirt configured to be carried by the trailer, wherein the first trailer skirt is configured to be oriented such that the first side surface of the trailer extends in the longitudinal direction and the first trailer skirt is oriented at an angle greater than 0 degrees but less than or equal to 20 degrees to the first side surface of the trailer in the direction of extension of the first trailer skirt forward in the longitudinal direction; and a second trailer skirt configured to be carried by the trailer, wherein the second trailer skirt is configured to be oriented such that the second side surface of the trailer extends in the longitudinal direction and the second trailer skirt is oriented at an angle greater than 0 degrees but less than or equal to 20 degrees to the second side surface of the trailer in the direction of extension of the second trailer skirt forward in the longitudinal direction;

wherein a corner with an outer surface is present at the engagement between the top fairing and the first side fairing, wherein the corner is rounded and has a middle section located between a leading section and a tailing section in the longitudinal direction;

wherein the leading section, the middle section, and the tailing section are all rounded and wherein the middle section has a radius of curvature that is larger than a radius of curvature of the leading section, and wherein the middle section has a radius of curvature that is larger than a radius of curvature of the tailing section.

14. An apparatus for a trailer, comprising:

a top fairing configured for being mounted to a top surface of the trailer at a location closer to the back of the trailer than to the front of the trailer, wherein the top fairing has a height that extends from the top surface of the trailer to an upper terminal point of the top fairing in the vertical direction, wherein the trailer has a longitudinal direction, a lateral direction, and a vertical direction;

a first side fairing configured for being mounted to a first side surface of the trailer, wherein the top fairing engages the first side fairing, wherein the first side fairing has a width that extends from the first side surface of the trailer to an outer terminal point of the first side fairing in the lateral direction, wherein a magnitude of the height of the top fairing is greater than a magnitude of the width of the first side fairing;

a second side fairing configured for being mounted to a second side surface of the trailer;

a first trailer skirt configured to be carried by the trailer, wherein the first trailer skirt is configured to be oriented such that the first side surface of the trailer extends in the longitudinal direction and the first trailer skirt is oriented at an angle greater than 0 degrees but less than or equal to 20 degrees to the first side surface of the trailer in the direction of extension of the first trailer skirt forward in the longitudinal direction; and a second trailer skirt configured to be carried by the trailer, wherein the second trailer skirt is configured to be oriented such that the second side surface of the trailer extends in the longitudinal direction and the second trailer skirt is oriented at an angle greater than 0 degrees but less than or equal to 20 degrees to the second side surface of the trailer in the direction of extension of the second trailer skirt forward in the longitudinal direction;

wherein a corner with an outer surface is present at the engagement between the top fairing and the first side fairing, wherein the corner has an inner surface that is located opposite to the outer surface of the corner, wherein the corner has an air blocking tab that extends from the inner surface and is configured for being disposed within a channel of the trailer.

\* \* \* \* \*